(12) United States Patent
Smith et al.

(10) Patent No.: US 10,505,403 B1
(45) Date of Patent: Dec. 10, 2019

(54) WIRELESS CHARGING SYSTEM WITH TEMPERATURE SENSING

(71) Applicant: Apple Inc., Cupertino, CA (US)

(72) Inventors: J. Stephen Smith, San Jose, CA (US); Siddharth Seth, Campbell, CA (US); Douglas J. Adams, Mountain View, CA (US); Michael A. Cretella, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/204,847

(22) Filed: Nov. 29, 2018

Related U.S. Application Data

(60) Provisional application No. 62/726,072, filed on Aug. 31, 2018.

(51) Int. Cl.
| | | |
|---|---|---|
| *H02J 50/60* | (2016.01) | |
| *H02J 7/02* | (2016.01) | |
| *H01C 7/00* | (2006.01) | |
| *H02J 50/12* | (2016.01) | |

(52) U.S. Cl.
CPC .............. *H02J 50/60* (2016.02); *H01C 7/006* (2013.01); *H01C 7/008* (2013.01); *H02J 7/025* (2013.01); *H02J 50/12* (2016.02)

(58) Field of Classification Search
CPC .. H02J 7/0052; H02J 7/007; H02J 2007/0062; G01R 31/3835
See application file for complete search history.

(56) References Cited

U.S. PATENT DOCUMENTS

| | | | |
|---|---|---|---|
| 4,320,165 A | * | 3/1982 | Cash ........................ H01C 7/06 29/620 |
| 6,781,056 B1 | | 8/2004 | O'Rourke |
| 9,080,988 B2 | | 7/2015 | Okada et al. |
| 9,479,013 B2 | | 10/2016 | Joye et al. |
| 9,685,824 B2 | | 6/2017 | Lijima et al. |
| 9,735,605 B2 | | 8/2017 | Garcia Briz et al. |
| 9,787,365 B2 | | 10/2017 | Lee et al. |
| 9,893,549 B2 | | 2/2018 | Borngraber |

(Continued)

*Primary Examiner* — Drew A Dunn
*Assistant Examiner* — Sailesh Thapa
(74) *Attorney, Agent, or Firm* — Treyz Law Group; George Victor Treyz; Jason Tsai

(57) ABSTRACT

A wireless power transmitting device transmits wireless power signals to a wireless power receiving device. To detect foreign objects, the wireless power transmitting device has an array of temperature sensors. The array of temperature sensors may include temperature sensor components such as temperature sensitive thin-film resistors or other temperature sensitive components. A temperature sensor may have thin-film resistors formed on opposing sides of a substrate. The thin-film resistors may be formed from meandered metal traces to reduce eddy current formation during operation of the wireless power transmitting device. Signal paths coupling control circuitry on the wireless power transmitting device to the array of temperature sensors may be configured to extend along columns of the temperature sensors without running along each row of the temperature sensors, thereby reducing eddy currents from loops of signal routing lines. Some temperature sensors may have multiple components coupled to a common temperature sensing pad.

23 Claims, 12 Drawing Sheets

(56) References Cited

U.S. PATENT DOCUMENTS

| | | | |
|---|---|---|---|
| 2003/0174041 A1* | 9/2003 | Wienand | G01K 7/183 338/25 |
| 2006/0034346 A1* | 2/2006 | Saio | G01K 1/026 374/185 |
| 2007/0195066 A1* | 8/2007 | Bernitz | G01K 7/186 345/174 |
| 2009/0101821 A1* | 4/2009 | Masafumi | G01J 5/10 250/338.3 |
| 2009/0167432 A1* | 7/2009 | van den Heuvel | H03F 3/45968 330/69 |
| 2009/0278523 A1 | 11/2009 | Yoda | |
| 2013/0181724 A1 | 7/2013 | Teggatz | |
| 2013/0193771 A1 | 8/2013 | Teggatz | |
| 2013/0241476 A1 | 9/2013 | Okada | |
| 2013/0259086 A1* | 10/2013 | Lane | G01J 5/046 374/121 |
| 2014/0159501 A1 | 6/2014 | Kanno | |
| 2015/0323694 A1 | 11/2015 | Roy | |
| 2015/0331135 A1 | 11/2015 | Widmer et al. | |
| 2016/0134129 A1 | 5/2016 | Watanabe | |
| 2016/0336809 A1 | 11/2016 | Gluzman et al. | |
| 2017/0141604 A1 | 5/2017 | Park et al. | |
| 2018/0054081 A1* | 2/2018 | Hwang | G01J 5/041 |
| 2018/0166929 A1 | 6/2018 | Sawai et al. | |
| 2018/0198313 A1 | 7/2018 | Lee | |
| 2018/0198323 A1 | 7/2018 | Widmer et al. | |
| 2018/0091001 A1 | 8/2018 | Meichle | |
| 2018/0323659 A1 | 11/2018 | Maniktala | |

\* cited by examiner

WIRELESS CHARGING SYSTEM WITH TEMPERATURE SENSING

This application claims priority to U.S. provisional patent application No. 62/726,072 filed Aug. 31, 2018, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to another electronic device such as a battery-powered, portable electronic device. The portable electronic device receives the wirelessly transmitted power and uses this power to charge an internal battery and to power components in the portable electronic device. Foreign objects in proximity to a wireless power receiving device can intercept power intended for the wireless power receiving device. It is desirable to reduce power transfer to foreign objects during wireless charging operations.

SUMMARY

A wireless power transmitting device transmits wireless power signals to a wireless power receiving device. To detect foreign objects, the wireless power transmitting device has an array of temperature sensors. Control circuitry in the device is configured to detect a foreign object on a charging surface of the device based on temperature information gathered with the temperature sensors. Appropriate action such as the halting of wireless charging operations is then taken.

The array of temperature sensors may include temperature sensor components such as temperature sensitive thin-film resistors or other temperature sensitive components. A temperature sensor may have thin-film resistors formed on opposing sides of a substrate. The thin-film resistors may be formed from spiral metal traces to reduce eddy current formation during operation of the wireless power transmitting device. Signal paths coupling control circuitry on the wireless power transmitting device to the array of temperature sensors may be configured to extend along columns of the temperature sensors without running along each row of the temperature sensors, thereby reducing eddy currents from loops of signal routing lines.

Some temperature sensors may have multiple components coupled to a common temperature sensing pad. The control circuitry may average readings from multiple components in a single temperature sensor to reduce the impact of lateral temperature gradients on temperature measurements.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current drive signals to one or more wireless power transmitting coils. This causes the coils to transmit alternating-current electromagnetic signals (sometimes referred to as wireless power signals) to one or more corresponding wireless power receiving coils in the wireless power receiving device. Rectifier circuitry in the wireless power receiving device converts received wireless power signals into direct-current (DC) power for the wireless power receiving device.

A temperature sensor array is included in the wireless power transmitting device 10 to monitor for elevated temperatures on a charging surface of wireless power transmitting device 10. Temperature rises exceeding expected device operating responses can be indicative of the presence of undesired foreign objects, such as coins, on the wireless power transmitting device that are intercepting power during wireless power transmission operations.

Figure 1:
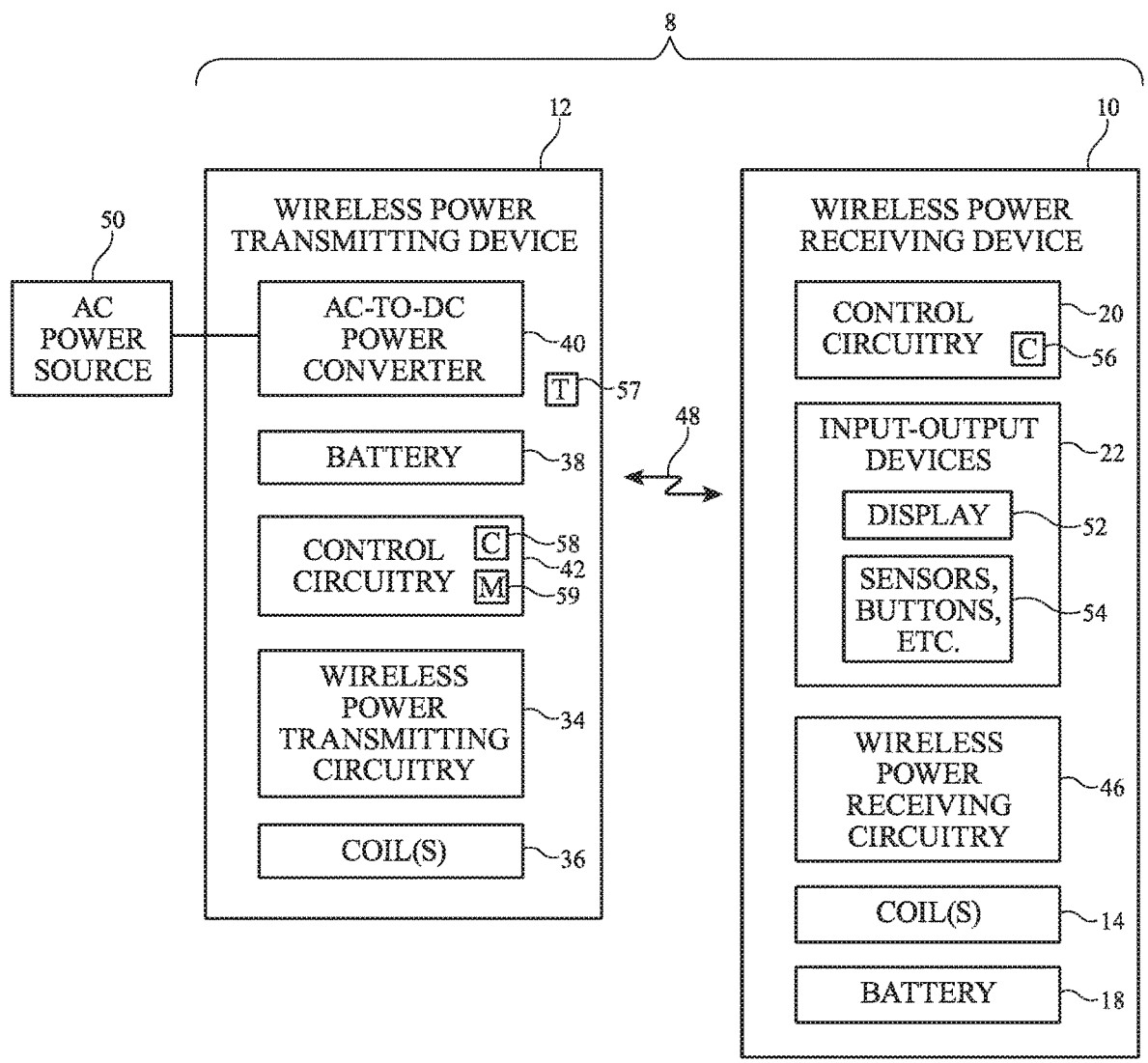
FIG. 1 is a schematic diagram of an illustrative wireless charging system in accordance with embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations are sometimes be described herein as examples.

During operation of system 8, a user places one or more devices 10 on the charging surface of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as alternating-current-to-direct current (AC-DC) power converter 40 can convert power from a mains power source or other alternating-current (AC) power source into direct-current (DC) power that is used to power control circuitry 42 and other circuitry in device 12. During operation, control circuitry 42 uses wireless power transmitting circuitry 34 and one or more coil(s) 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC signals (drive signals) through coil(s) 36. As the AC signals pass through coil(s) 36, alternating-current electromagnetic fields (wireless power signals 48) are produced that are received by corresponding coil(s) 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 converts received AC signals (received alternating-current currents and voltages associated with wireless power signals) from coil(s) 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with corresponding wireless communications circuitry 58 in control circuitry 42 of wireless power transmitting device 12 and/or other equipment, audio components, and other components (e.g., input-output devices 22 and/or control circuitry 20) and are used in charging an internal battery in device 10 such as battery 18.

Wireless power transmitting device includes measurement circuitry 59 that uses coils 36 and/or other circuitry to measure the characteristics of electronic devices and other object overlapping coils 36. As an example, measurement circuitry 59 may include impulse response measurement circuitry (sometimes referred to as inductance measurement circuitry and/or Q factor measurement circuitry) and/or other measurement circuitry coupled to coils 36 to make measurements of inductance L and quality factor Q for each of coils 36, and mutual inductance M of pairs of coils 36. During impulse response measurements, control circuitry 42 directs circuitry 59 to supply one or more excitation pulses (impulses) to each coil 36. The impulses may be, for example, square wave pulses of 1 µs in duration. Longer or shorter pulses may be applied, if desired. The resulting resonant response (ringing) of coil 36 and resonant circuitry in device 12 that includes coil 36 is then measured by circuitry 59 to determine L, M, and Q. Using measurements such as these, control circuitry 42 can monitor one or more of coils 36 (e.g., each coil 36 in an array of coils 36 in device 12) for the presence of an external object such as one of devices 10 that is potentially compatible for wireless power transfer (sometimes referred to herein as a wireless power receiving device) or an incompatible object such as a coin or paperclip (sometimes referred to herein as a foreign object). Foreign objects are also detected based on temperature information such as temperature sensor measurements made using temperature sensors 57. In some embodiments, foreign objects are detected using temperature information or impedance information alone. In other embodiments, control circuitry 42 uses both temperature information and impedance information in detecting foreign objects.

Devices 12 and 10 include control circuitry 42 and 20. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data such as temperature sensor data, processing user input, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and 20 may be configured to support wireless communications between devices 12 and 10 (e.g., control circuitry 20 may include wireless communications circuitry such as circuitry 56 and control circuitry 42 may include wireless communications circuitry such as circuitry 58). Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly during operation of system 8. Devices 10 and 12 may, for example, have wireless transceiver circuitry in control circuitry 42 and 20 (see, e.g., wireless communications circuitry such as circuitry 58 and 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). In some embodiments, device 12 communicates wirelessly with devices 10 to establish the characteristics of devices 10 and receive power at devices 10. The coil information and wirelessly received information is used to account for power transmitted, power received, and wireless power transfer efficiency and losses, referred to as power counting (PC). Some losses would be characterized as expected, for example, eddy currents in metallic components, and in other cases, losses may be due to foreign objects. In some embodiments, power counting is used to distinguish circumstances where losses are low enough, or efficiency high enough, for charging to proceed, or to be inhibited if potentially significant foreign objects are inferred to be present.

Figure 2:
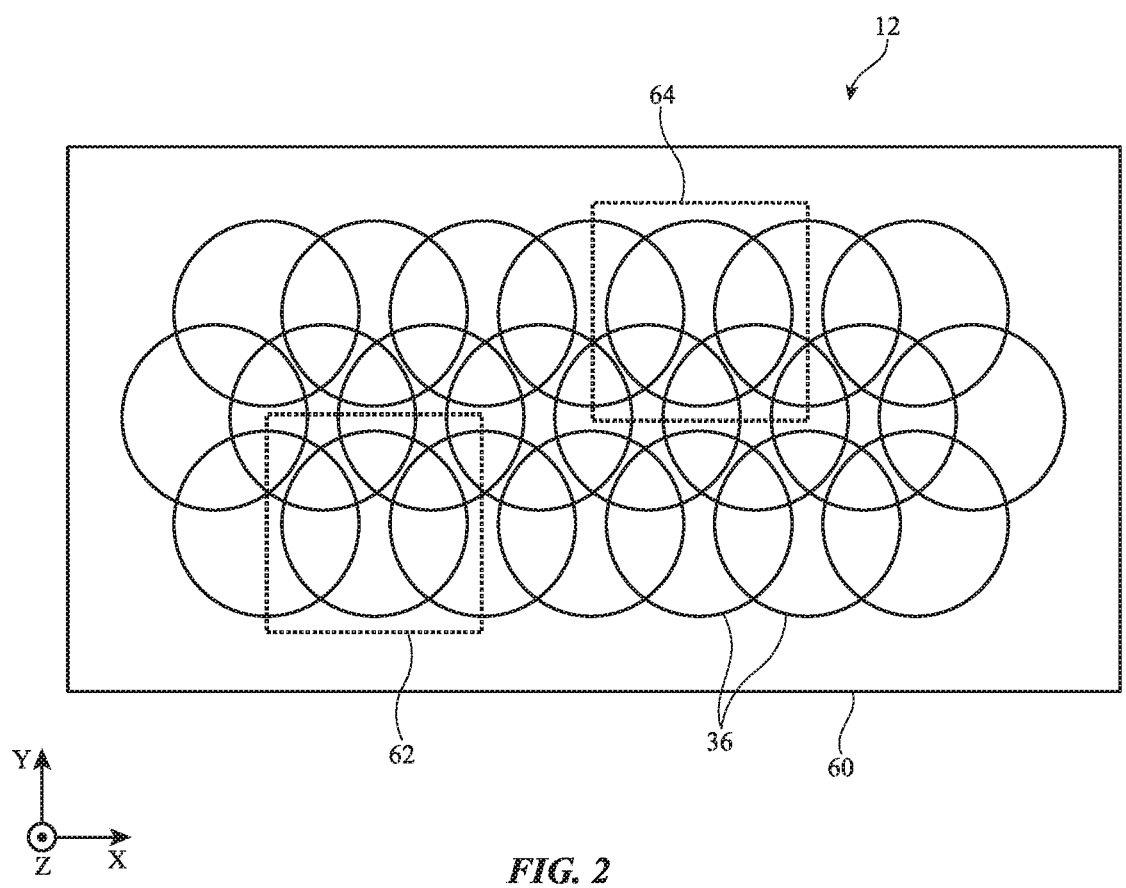
FIG. 2 is a top view of an illustrative wireless power transmitting device with an array of coils that forms a wireless charging surface in accordance with an embodiment.

With one illustrative configuration, wireless transmitting device 12 is a wireless charging mat or other wireless power transmitting equipment that has an array of coils 36 that supply wireless power over a wireless charging surface. This type of arrangement is shown in FIG. 2. In the example of FIG. 2, device 12 has an array of coils 36 that lie in parallel X-Y planes. Coils 36 of device 12 are covered by one or more planar dielectric layers each of which may include one or more layers of material. The outermost surface of the dielectric layer(s) forms charging surface 60. The lateral dimensions (X and Y dimensions) of the array of coils 36 in device 36 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

As shown in the example of FIG. 2, external objects such as external object 62 and object 64 may overlap one or more coils 36. In some situations, objects 62 and 64 will be portable electronic devices 10. In other situations, one or more of objects 62 and 64 will be incompatible external objects (e.g., foreign objects such as metallic coins or other conductive objects). Situations may also arise in which foreign objects and wireless power receiving devices magnetically coupled to the same coil or coils 36. During operation, system 8 automatically detects whether objects located on surface 60 correspond to wireless power receiving devices 10, to which wireless power should be provided, or foreign objects, to which wireless power should not be coupled. In an illustrative embodiment, impedance monitoring circuitry in measurement circuitry 59 and/or temperature measurement circuitry such as temperature sensors 57 is used in detecting when foreign objects are present and/or when undesired heating of foreign objects is taking place. Upon detection of a foreign object, system 8 automatically takes suitable action such as reducing and/or halting wireless power transmission.

Figure 3:
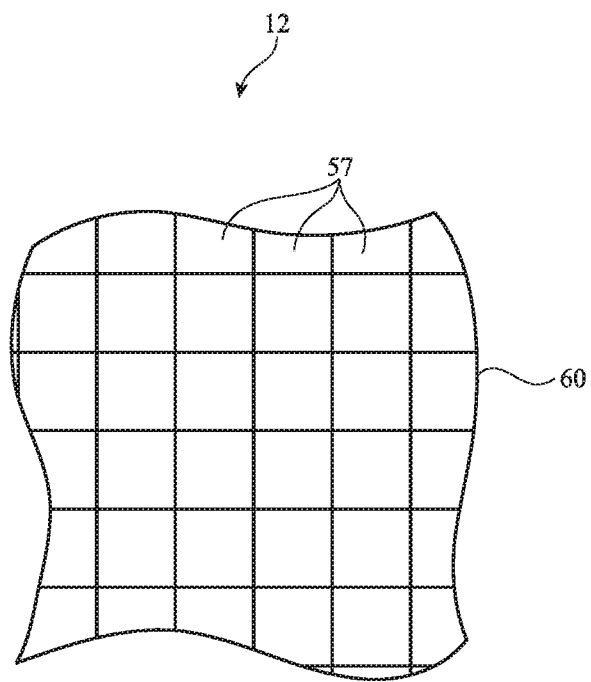
FIG. 3 is a top view of a portion of an illustrative temperature sensor array extending across the wireless charging surface in accordance with an embodiment.

When wireless power from coils 36 is being transmitted, currents may be induced in foreign objects on charging surface 60 that cause these objects to heat. To monitor for undesired temperature rises of the type associated with heating of foreign objects on charging surface 60, temperature sensors 57 may be formed in an array across charging surface 60, as shown in FIG. 3. Temperature sensors 57 can be arranged in an array having N rows and M columns (e.g., where N and/or M are at least 1, at least 2, at least 5, at least 10, at least 20, at least 35, at least 60, at least 100, at least 200, at least 400, fewer than 1000, fewer than 450, fewer than 210, fewer than 125, fewer than 70, fewer than 50, fewer than 40, or other suitable values. Temperature sensors 57 may be organized in a rectangle with rounded corners or other suitable shape (e.g., a shape that matches the outline of charging surface 60). Temperature sensors 57 are overlapped by the layer of dielectric on the top of wireless power transmitting device 12 that forms charging surface 60 and are interposed between coils 36 and the layer of dielectric.

Figure 4:
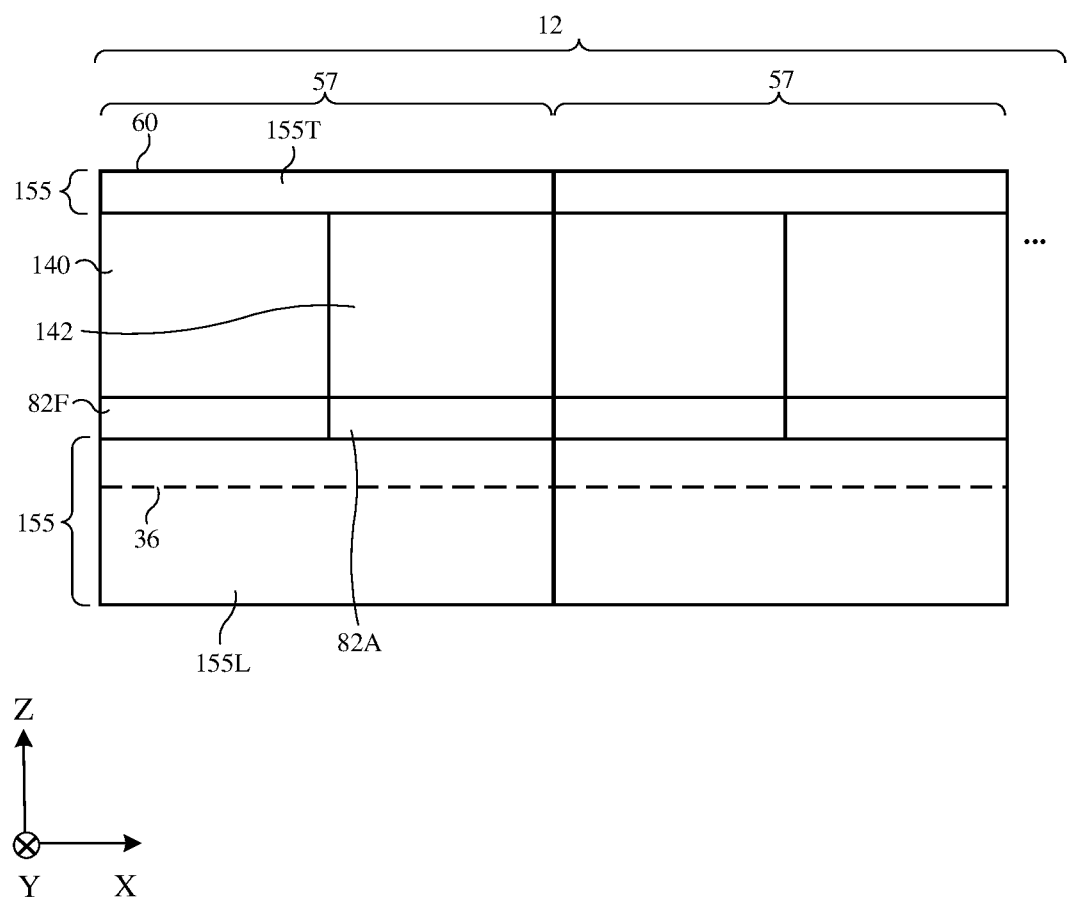
FIGS. 4, 5, 6, 7, and 8 are cross-sectional side views of illustrative wireless power transmitting devices with temperature sensing circuitry in accordance with embodiments.

A cross-sectional side view of wireless power transmitting device 12 is shown in FIG. 4. Device 12 of FIG. 4 has an array of temperature sensors 57 configured to make temperature measurements. Structures 155 include polymer layers, metal layers, ferrite layers, and/or other structures for forming a housing and other structures for device 12. Upper portion 155T of structures 155 forms charging surface 60. Lower portion 155L of structures 155 includes coils 36. Structures 140 may overlap temperature sensing components such as temperature sensing component 82F and structures 142 may overlap temperature sensing components such as temperature sensing component 82A. Structures 140 and 142, which may include polymer layers, air gaps, metal layers, and/or other materials, can have different thermal resistances, so that differential temperature measurements may be made to gather information on heat flux through charging surface 60. Temperature sensing components 82F and 82A may be arranged adjacent to each other as shown in the example of FIG. 4 or may, if desired, overlap each other (e.g., some or all of component 82F may be interposed between charging surface 60 and component 82A).

The temperature sensing components in device 12 (e.g., components such as components 82F and 82A) may be thermistors (e.g., resistive temperature sensing devices of the type that are sometimes based on temperature sensitive ceramics or metal oxides), resistance thermometers (e.g., resistive temperature sensing devices of the type that are sometimes formed from metal temperature sensing elements such as elements formed from platinum, nickel, or other metals and which may, if desired, be formed from thin-film resistors), thermocouples, semiconductor temperature sensing devices such as semiconductor diodes, or other temperature sensor components. Illustrative configurations in which temperature sensors 57 are formed using temperature sensor components such as resistance thermometers formed from thin-film temperature-sensing resistors are sometimes described herein as an example.

If desired, temperature sensors 57 may each include a single temperature sensing component (e.g., to form an array of sensors that monitor for elevated temperatures). In the illustrative embodiment of FIG. 4, each temperature sensor 57 includes first and second temperature sensing components that are used in measuring temperature gradients and heat flux through charging surface 60. There is a single one of components 82F and a single one of components 82A in each illustrative temperature sensor 57 of FIG. 4. Arrangements in which device 12 includes an array of temperature sensors 57 having first and second sets of temperature sensing components and in which some of the second set of temperature sensing components are shared by more than one of the first set of temperature sensing components may also be used. For example, each sensor 57 may include a respective one of components 82F and each of components 82A may be shared by multiple sensors 57.

By including temperature sensing components in device 12 such as components 82F and 82A that are thermally coupled to charging surface 82 with different amounts of thermal resistance, differential (gradient) temperature measurements and heat flux measurements can be made. The temperature sensing components may overlap each other and/or may be formed adjacent to each other. In the illustrative configuration of FIG. 4, temperature sensors 57 each include a first temperature sensing component 82F and a second temperature sensing component 82A, that is adjacent to temperature sensing component 82F. There may be more than one of components 82F and/or more than one of components 82A in each sensor 57, if desired.

Structures 140 and 142 may include air gaps, polymer structures, metal structures (e.g., optional temperature sensor metal pads and/or vias), and/or other structures. The thermal conductivity of structures 140 and the portion of structures 155 interposed between temperature sensing component 82F and charging surface 60 is greater than the thermal conductivity of structures 142 and the portions of structures 155 interposed between temperature sensing components 82A. As a result, there is a greater thermal resistance between temperature sensing component 82A and charging surface 60 than between temperature sensing component 82F and charging surface 60. Components 82F and 82A therefore respond differently to a heated object on surface 60. There is more thermal resistance between surface 60 and component 82A than between surface 60 and component 82F, so component 82F tends to react quickly while component 82A serves to measure the ambient temperature of the interior of device 12. When a heated object is present on device 12 and surface 60 is heated, there will be a temperature gradient (high-to-low) established between surface 60 and the interior of device 12 and this gradient (and therefore the heat flux flowing through surface 60) can be measured using the differential temperature sensing arrangement of FIG. 4 or other heat flux measurement arrangements.

Figure 5:
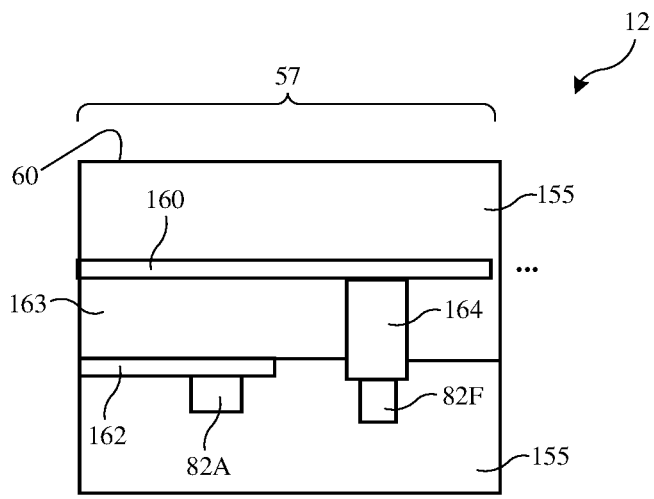
Figure 6:
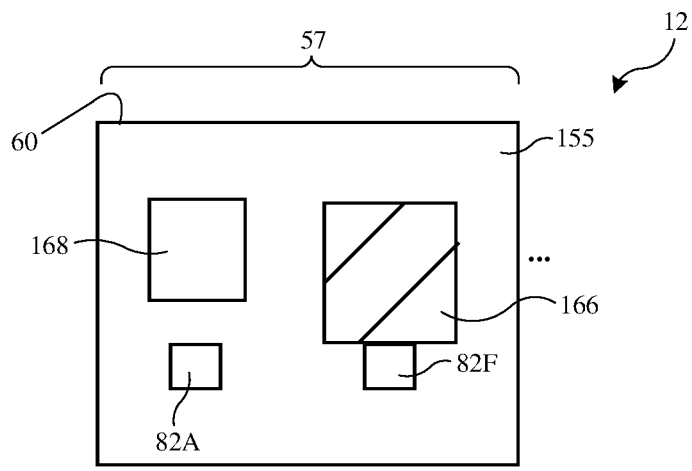
Figure 7:
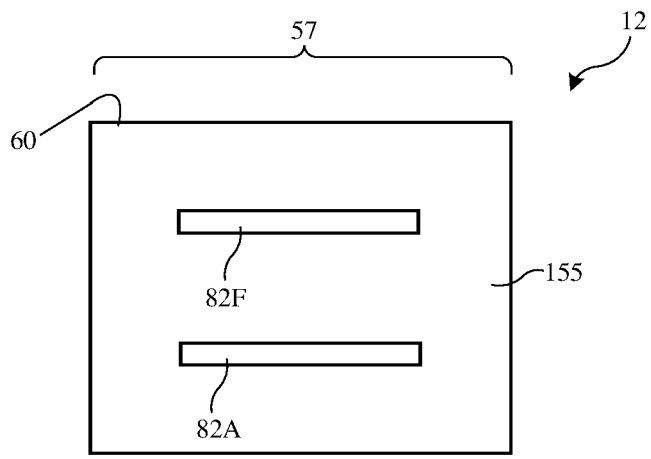
Figure 12:
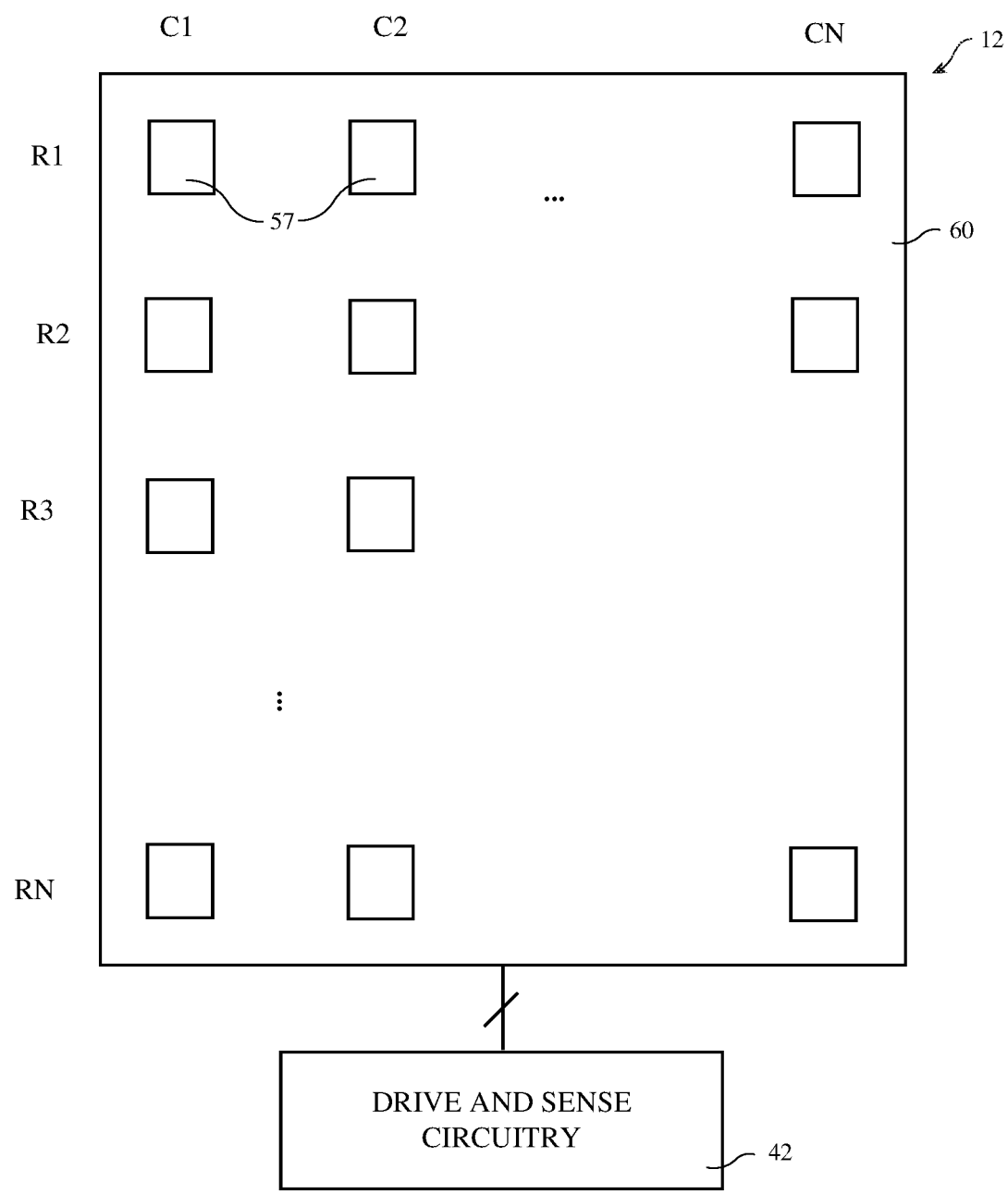
FIG. 12 is a diagram of an illustrative temperature sensor array in accordance with an embodiment.

Illustrative embodiments for temperature sensors 57 in FIG. 12 are shown in FIGS. 5, 6, and 7. In the example of FIG. 5, component 82A is thermally coupled to temperature sensor pad 162 and component 82F is thermally coupled to temperature sensing pad 160 through via 164. Via 164 may be a thermally conductive structure formed from metal and may pass through dielectric substrate 163 (e.g., a printed circuit substrate). Pads 160 and 162 may be formed from metal traces on opposing sides of substrate 163 (as an example). Fingers and other structures may be formed in pads 160 and 162 to reduce eddy currents when wireless power signals are being transmitted to device 10 by coils 36. Because via 164 thermally couples component 82F to a pad such as pad 160 that is closer to surface 60 than pad 162, component 82F will tend to react more quickly to changes in temperature at surface 60, whereas component 82A will tend to measure internal (e.g., ambient) temperatures in device 12.

In the example of FIG. 6, component 82F is overlapped by metal structures 166 and component 82A is overlapped by air-filled cavity 168. Air is more thermally resistive than metal, so the thermal resistance between component 82A and surface 60 is greater than the thermal resistance between component 82F and surface 60.

In the example of FIG. 7, components 82A and 82F overlap each other. Component 82F is closer to surface 60 than component 82A. As a result, component 82A is thermally coupled to surface 60 by a greater thermal resistance than component 82F.

Additional embodiments of device 12 may have different configurations for temperature sensing components 82F and 82A. As described above, for example, there need not be equal numbers of components 82F and 82A in the array of temperature sensors 57 in device 12. There may be, for example, a larger number of components 82F than components 82A.

Figure 8:
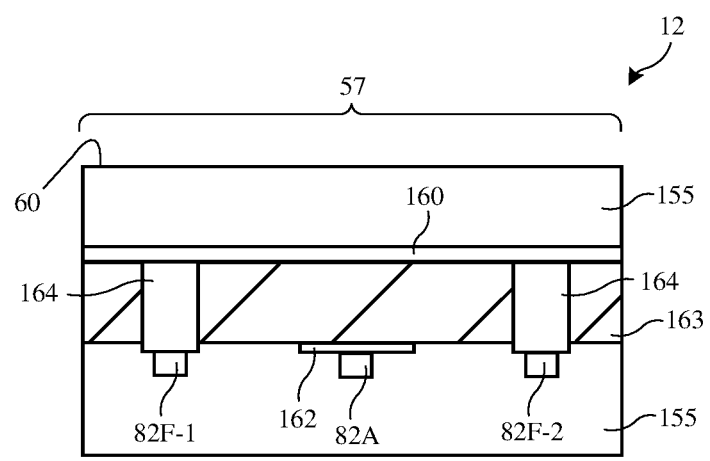

FIG. 8 is a cross-sectional side view of a portion of device 12 showing how each temperature sensor 57 may, if desired, include multiple temperature sensing components coupled to a common temperature sensor pad. In the illustrative embodiment of FIG. 8, there are two temperature sensor components 82F-1 and 82F-1 located at different horizontal locations across a shared temperature sensor pad 160. Temperature sensor component 82F-1 is thermally coupled to a left-hand portion of pad 160 through a left-hand via 164 and temperature sensor component 82F-2 is thermally coupled to a right-hand portion of pad 160 through a right-hand via 164. During operation, control circuitry 42 can average the temperature sensor readings gathered with sensor components 82F-1 and 82F-2 or may otherwise process these signals to help reduce measurement inaccuracies due to lateral thermal gradients. In general, any suitable number of temperature sensing components 82F (e.g., one, at least two, at least three, at least four, etc.) may be coupled to the upper thermal pad or other structures in each temperature sensor 57 and any suitable number of temperature sensing components 82A (e.g., one, at least two, at least three, at least four, etc.) may be coupled to the lower thermal pad or other structures in each temperature sensor 57.

Figure 9:
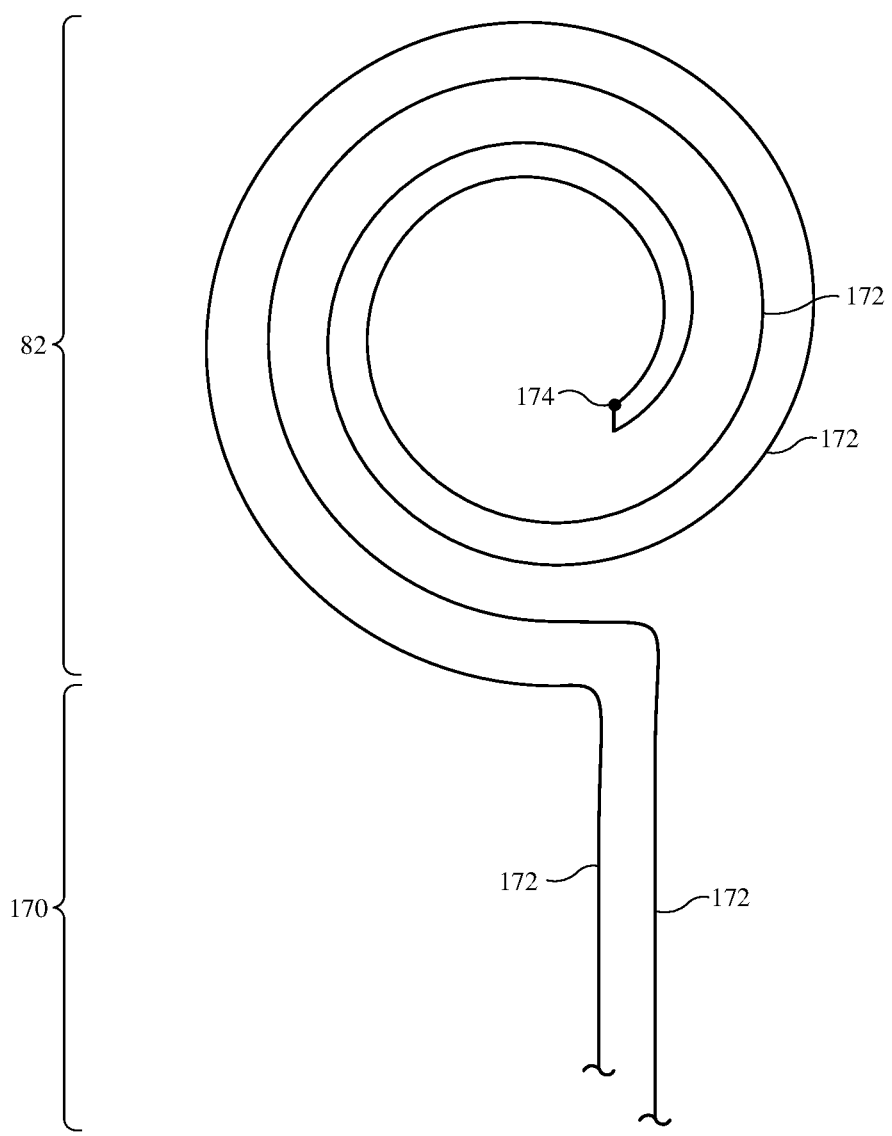
FIG. 9 is a top view of an illustrative spiral metal trace in a thin-film resistive temperature sensor in accordance with an embodiment.

Components 82A and 82F may, if desired, be formed from thin-film resistive sensors. A metal trace pattern of the type that may be used for a thin-film resistive sensor is shown in FIG. 9. As shown in FIG. 9, the metal trace pattern of FIG. 9 may include a first portion 170 that forms signal traces 172 and a second portion that forms a thin-film resistive (temperature sensing component 82). The traces 172 that form component 82 may be coupled at end point 174. A meandered pattern which retraces along its own path or other suitable layout may be used for traces 172 in component 82 to help reduce magnetic field coupling with the wireless power signals being transmitted by coils 36. Portion 170 may form interconnect lines that couple component 82 to an integrated circuit and/or other processing circuitry (e.g., control circuitry 42). During operation, control circuitry 42 may measure the resistance of component 82.

Figure 10:
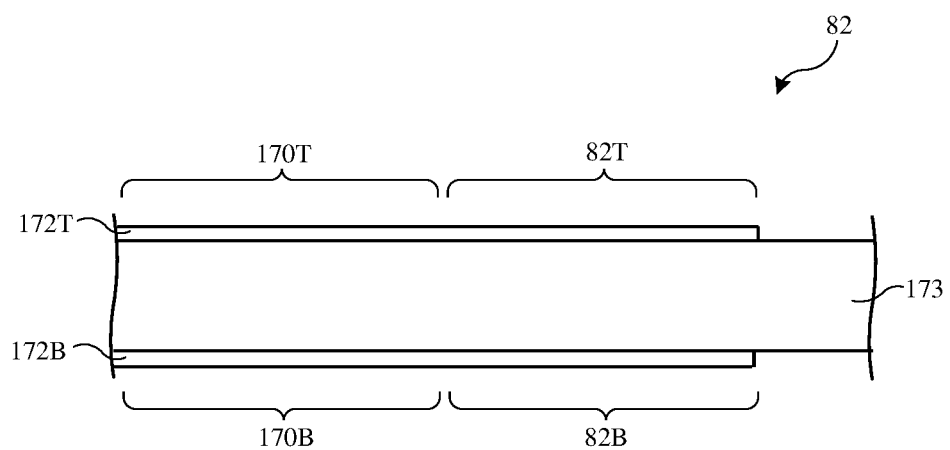
FIG. 10 is a side view of illustrative metal traces in a thin-film resistive temperature sensor in accordance with an embodiment.

Metal traces such as traces 172 of FIG. 9 may be formed on one or both sides of a printed circuit substrate or other dielectric substrate. A passivation layer of inorganic and/or organic material may cover traces 172. To provide component 82 with a desired change of resistance with temperature, traces 172 may be formed from a metal such as platinum, nickel, or other metal (e.g. an elemental metal). FIG. 10 is a cross-sectional side view of an illustrative double-sided printed circuit board substrate (substrate 173). Temperature sensor component 82 of FIG. 10 has a first temperature sensing portion (temperature sensor component) 82T formed from a retraced spiral portion of metal traces 172T on the upper surface of substrate 173 and has a second temperature sensing portion (temperature sensor component) 82B formed from a retraced spiral portion of metal traces 172B on the opposing lower surface of substrate 173. Portion 170T of traces 172T electrically couples temperature sensing portion 82T to control circuitry 42 and portion 170B of traces 172B electrically couples temperature sensing portion 82B to control circuitry 42.

Figure 11:
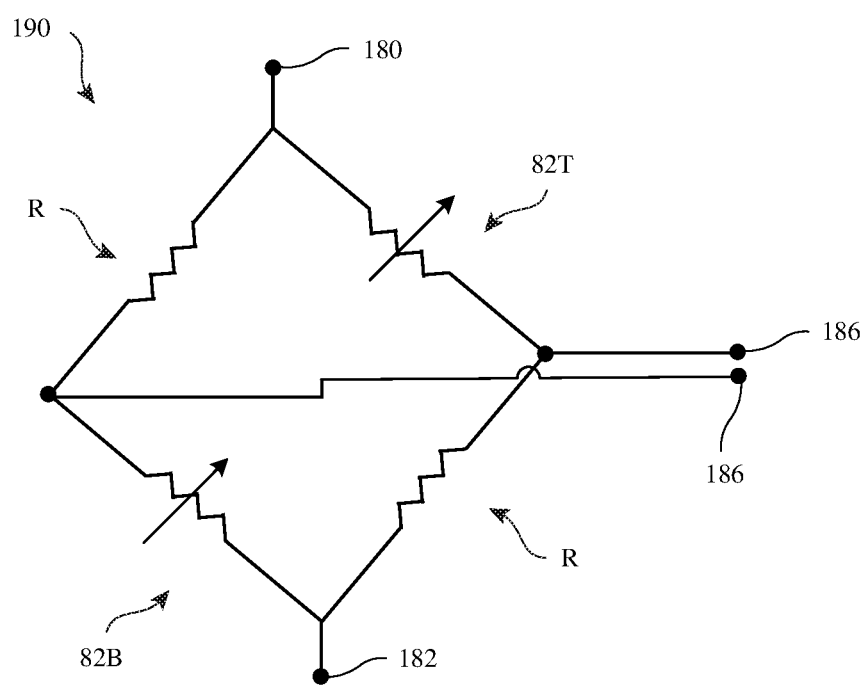
FIG. 11 is a circuit diagram of an illustrative temperature sensor with temperature sensor components such as temperature sensitive thin-film resistors or other temperature sensor components in a bridge circuit in accordance with an embodiment.

The temperature sensors of device 12 may include resistance measurement circuits for measuring resistance changes in temperature sensitive thin-film resistors. FIG. 11 is a circuit diagram showing an illustrative Wheatstone bridge circuit that may be used in measuring resistance changes in portions 82T and 82B. Wheatstone bridge 190 may be supplied with direct-current (DC) and/or alternating current (AC) drive (supply) signals across terminals 180 and 182 by control circuitry 42 while control circuitry 42 measures resulting output signals across output terminals 186. The use of this type of resistance measurement circuit may help reduce common mode noise (e.g., resistance changes in portions 170 of traces 172).). In some embodiments, there is a residual magnetic flux coupling from power transmission coils to circuits including the temperature sensitive resistors. In some embodiments, the temperature sensors are coupled into Wheatstone bridge circuits where the connection sense is reversed to the temperature sensitive resistors to substantially cancel magnetic flux coupling through the circuit when a differential measurement is made of a pair of coils. Other resistance measurement circuits may be used, if desired.

An illustrative embodiment for an array of temperature sensors 57 is shown in FIG. 12. FIG. 12 shows how sensors 57 may, if desired, be arranged in rows R1, R2, R3, ... RN and orthogonal columns C1, C2, ... CN across charging surface 60. Control circuitry 42 may measure the resistances of each of the temperature sensor components 82 such as temperature sensing components 82F and 82A in sensors 57. In some embodiments, each temperature sensor component is coupled to circuitry 42 with its own signal path. In other embodiments, rows, columns, and/or other sets of the temperature sensing components may use shared signal paths. As an example, the first terminal of each sensor component in a given row may be coupled to a shared drive line and the second terminal of each sensor component in a given column may be coupled to a shared sense line. In this type of embodiment, different rows may be driven with different alternating current signals so that sensing circuitry in control circuitry 42 can identify the row associated with each received signal on a given column.

Figure 13:
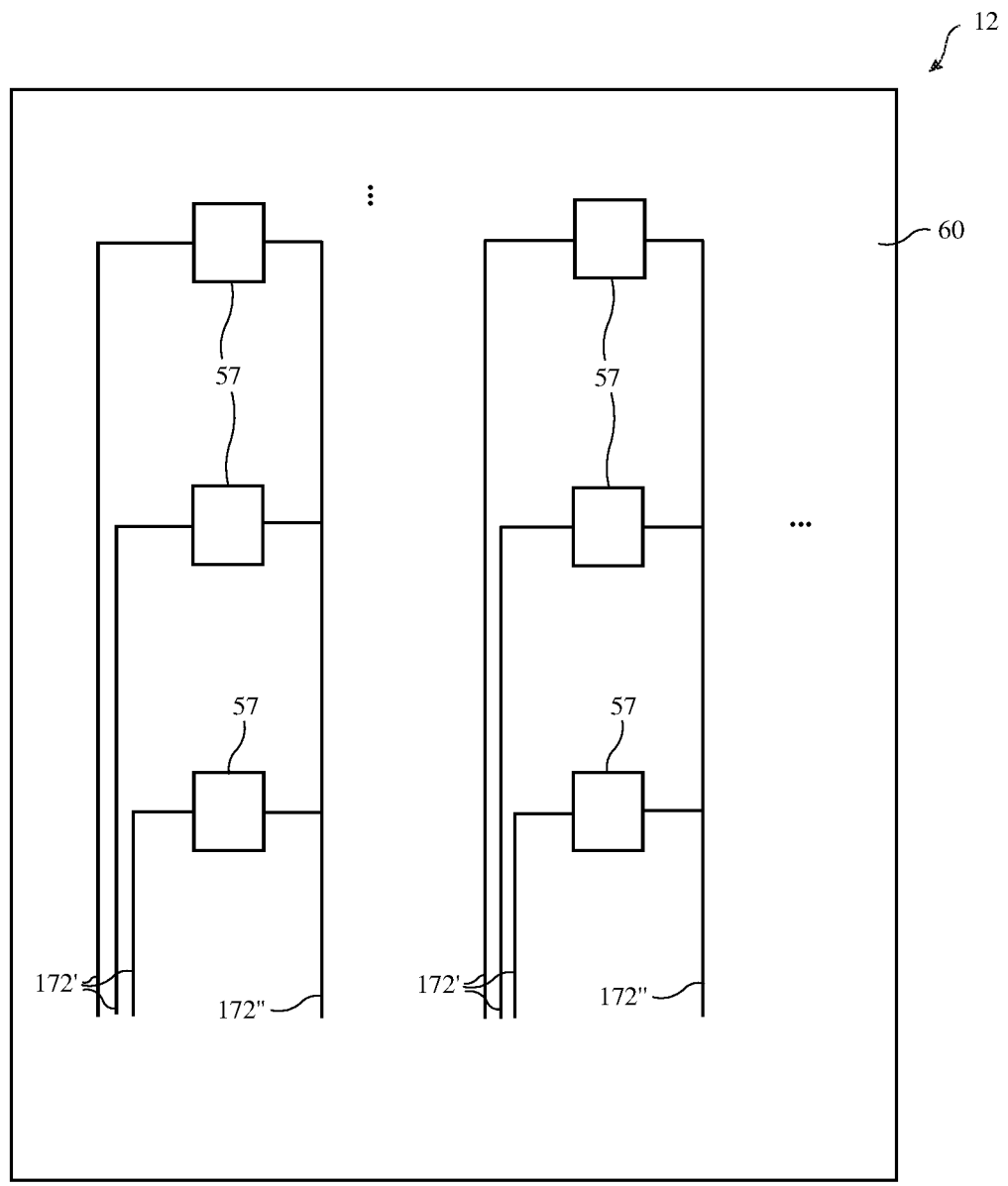
FIGS. 13 and 14 are diagrams of illustrative signal line patterns that may be used in electrically coupling temperature sensor components to control circuitry while avoiding eddy currents in accordance with embodiments.
Figure 14:
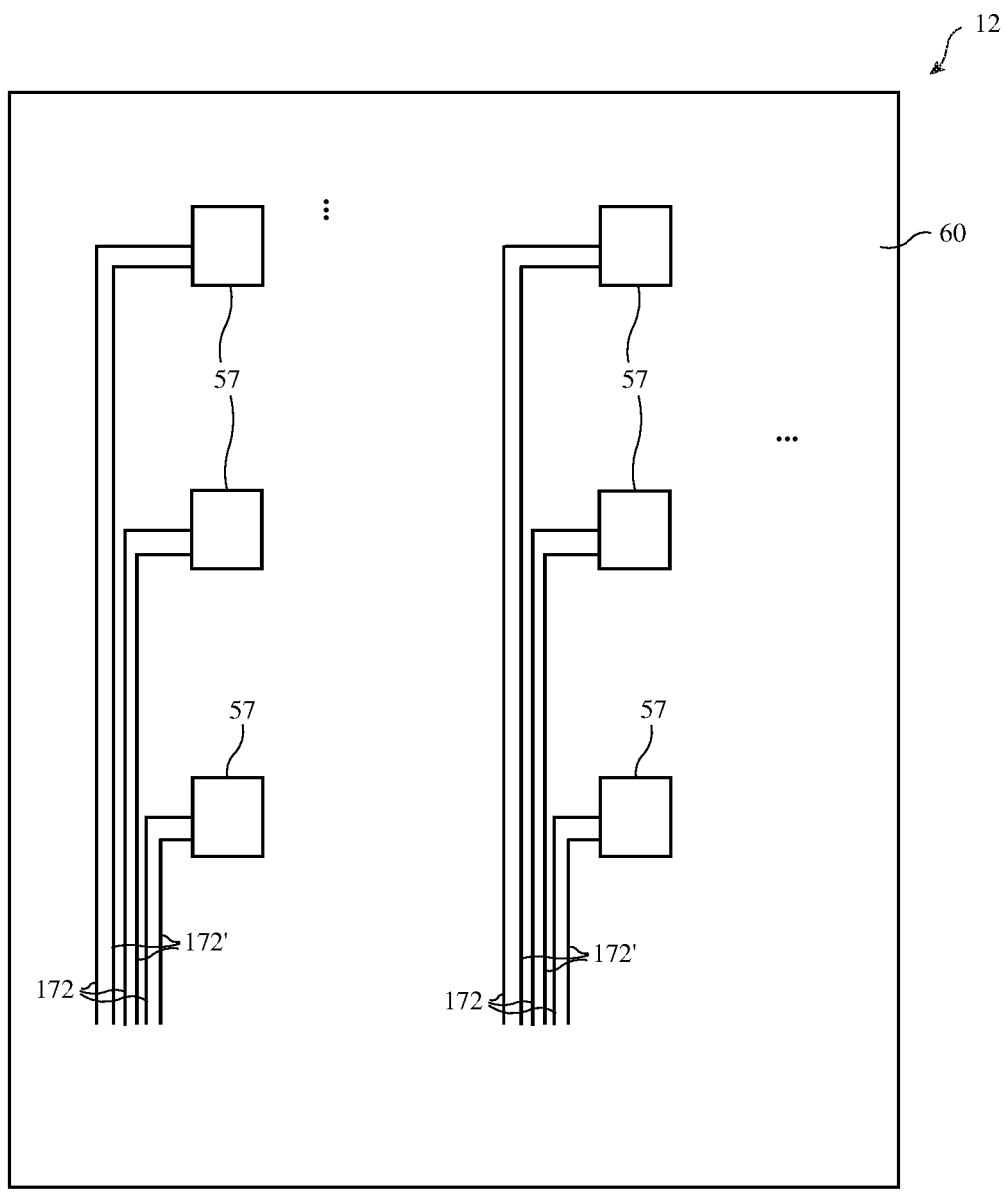

To help reduce eddy currents, current loops in the interconnect paths used in coupling control circuitry 42 to sensors 57 may be reduced by reducing or eliminating grid shaped interconnect paths formed from orthogonal signal lines. A first illustrative signal line pattern that may be used for coupling metal traces 172 to sensors 57 is shown in FIG. 13. In this type of arrangement, metal traces extend from control circuitry 42 vertically along respective columns of sensors 57 (and sensor components 82 associated with sensors 57). The first terminal of each sensor component in each row may be coupled to a different respective vertically extending interconnect path (vertical traces 172') and the second terminal of each sensor in each row may be coupled to a shared vertically extending (and therefore parallel) interconnect path (vertical trace 172"). No signal lines need extend past multiple columns of sensors (e.g., there need be no interconnect paths running perpendicular to the vertical traces). A second illustrative interconnect pattern for the sensor array is shown in FIG. 14. In the FIG. 14 embodiment, first traces 172' and second traces 172' extend from control circuitry 42 vertically along respective columns of sensors 57 (and sensor components 82 associated with sensors 57). Each trace 172' is coupled to a respective sensor 57 (e.g., a respective temperature sensor component 82 in that sensor 57) and each trace 172" is coupled to a respective sensor 57 (and component 82). For example, in each column, each component 82 may have a set of dedicated metal traces that run vertically to that component.

In the examples of FIGS. 13 and 14, the signal paths formed from metal traces 172 extend primarily along a single lateral dimension. For example, at least 70%, at least 90%, at least 95%, or other suitable portion of the signal paths (by length) may extend vertically (or, if desired, may extend along another lateral dimension such as horizontally). No signal paths need extend past multiple sensors in the direction orthogonal to this single lateral dimension. This helps reduce conductive signal path loops and reduces magnetic field coupling between the signal paths and coils 36. As a result, induced electromagnetic force due to changing magnetic flux through the sensor circuit has a reduced effect on the temperature measurement circuitry, and eddy currents in the signal paths due to the transmitted wireless power signals will be reduced and associated heating of the signal paths will be reduced.

The foregoing is illustrative and various modifications can be made to the described embodiments. The foregoing embodiments may be implemented individually or in any combination.

What is claimed is:

1. A wireless power transmitting device with a charging surface configured to receive a wireless power receiving device that has a wireless power receiving coil, the wireless power transmitting device comprising:
  at least one coil;
  wireless power transmitting circuitry coupled to the at least one coil to transmit wireless power signals to the wireless power receiving device;
  an array of temperature sensors overlapping the at least one coil and extending across the charging surface; and
  control circuitry configured to detect a foreign object on the charging surface based on temperature information gathered with the temperature sensors, wherein each temperature sensor in the array includes a substrate having opposing first and second sides, a first thin-film resistor formed on the first side of the substrate, and a second thin-film resistor formed on the second side of the substrate.

2. The wireless power transmitting device of claim 1, wherein the at least one coil comprises an array of coils.

3. The wireless power transmitting device of claim 1, wherein the temperature sensitive thin-film resistors include meandered metal traces.

4. The wireless power transmitting device of claim 1, wherein the temperature sensors comprise temperature sensitive resistors, wherein the temperature sensors are coupled into Wheatstone bridge circuits, and wherein each Wheatstone bridge circuit includes at least one temperature sensitive resistor.

5. The wireless power transmitting device of claim 1, wherein the temperature sensors comprise temperature sensitive resistors, wherein the temperature sensors are coupled into Wheatstone bridge circuits, wherein each Wheatstone bridge circuit includes at least two of the temperature sensitive resistors, and wherein the connection sense is reversed in to the temperature sensitive resistors to substantially cancel magnetic flux coupling through the Wheatstone bridge circuit.

6. The wireless power transmitting device of claim 1, wherein the array of temperature sensors includes rows and columns of the temperature sensors.

7. The wireless power transmitting device of claim 6, further comprising signal lines formed with metal traces that provide temperature measurements to the control circuitry from the temperature sensors, wherein the signal lines extend parallel to a selected one of: (1) the rows and (2) the columns.

8. The wireless power transmitting device of claim 1, further comprising signal lines that electrically couple the control circuitry to the temperature sensors, wherein the signal lines extend along a first dimension of the array of temperature sensors without extending past multiple temperature sensors in the array of temperature sensors along a second dimension of the array of temperature sensors and wherein the second dimension is orthogonal to the first dimension of the array of temperature sensors.

9. The wireless power transmitting device of claim 8, wherein the array of temperature sensors includes a first set of temperature sensitive resistors and a second set of temperature sensitive resistors, wherein temperature sensitive resistors of the first set of temperature sensitive resistors are separated from the charging surface by a first thermal resistance and wherein temperature sensitive resistors of the second set of temperature sensitive resistors are separated from the charging surface by a second thermal resistance that is greater than the first thermal resistance.

10. The wireless power transmitting device of claim 1, wherein the array of temperature sensors includes a first set of temperature sensitive resistors and a second set of temperature sensitive resistors, wherein temperature sensitive resistors of the first set of temperature sensitive resistors are separated from the charging surface by a first thermal resistance and wherein temperature sensitive resistors of the second set of temperature sensitive resistors are separated from the charging surface by a second thermal resistance that is greater than the first thermal resistance.

11. The wireless power transmitting device of claim 1, wherein the control circuitry is further configured to:
   responsive to detecting a foreign object on the charging surface, at least partially reduce power to the at least one coil.

12. The wireless power transmitting device of claim 1, wherein the at least one coil comprises first and second coils and wherein the control circuitry is further configured to:
   responsive to detecting a foreign object on the charging surface, at least partially reduce power to the first coil while maintaining power to the second coil.

13. A wireless power transmitting device with a charging surface configured to receive a wireless power receiving device that has a wireless power receiving coil, the wireless power transmitting device comprising:
   at least one coil;
   wireless power transmitting circuitry coupled to the at least one coil to transmit wireless power signals to the wireless power receiving device; and
   an array of temperature sensors overlapping the at least one coil and extending across the charging surface, wherein the temperature sensors each include a temperature sensor metal pad thermally coupled to multiple temperature sensor components.

14. The wireless power transmitting device of claim 13, wherein the at least one coil comprises an array of coils.

15. The wireless power transmitting device of claim 14, wherein the temperature sensor components include resistive temperature sensors.

16. The wireless power transmitting device of claim 14, wherein the resistive temperature sensors include meandered metal traces forming temperature sensitive resistors.

17. The wireless power transmitting device of claim 14, wherein the array of temperature sensors has first and second orthogonal dimensions and wherein the wireless power transmitting device further comprises:
   control circuitry configured to detect a foreign object on the charging surface based on temperature information gathered with the temperature sensors; and
   parallel signal lines that extend between the control circuitry and the temperature sensor components along the first dimension.

18. A wireless power transmitting device with a charging surface configured to receive a wireless power receiving device that has a wireless power receiving coil, the wireless power transmitting device comprising:
   at least one wireless power transmitting coil;
   wireless power transmitting circuitry coupled to the at least one wireless power transmitting coil to transmit wireless power signals to the wireless power receiving device;
   an array of temperature sensors, wherein the array of temperature sensors includes a first set of temperature sensor components and a second set of temperature sensor components, wherein the first set of temperature sensor components are separated from the charging surface by a first thermal resistance and wherein the second set of temperature sensor components are separated from the charging surface by a second thermal resistance greater than the first thermal resistance;
   signal lines that electrically couple the control circuitry to the array of temperature sensors; and
   control circuitry configured to detect a foreign object on the charging surface based on temperature information gathered using the array of temperature sensors and provided to the control circuitry using the signal lines, wherein the signal lines extend along a first dimension of the array of temperature sensors without extending past multiple temperature sensors in the array of temperature sensors along a second dimension of the array of temperature sensors that is orthogonal to the first dimension of the array of temperature sensors.

19. The wireless power transmitting device of claim 18, wherein the temperature sensors comprise thermistors.

20. The wireless power transmitting device of claim 19, wherein the at least one wireless power transmitting coil comprises an array of wireless power transmitting coils and wherein the array of temperature sensors overlaps the array of wireless power transmitting coils.

21. The wireless power transmitting device of claim 18, wherein the temperature sensors comprise thin-film resistors.

22. The wireless power transmitting device of claim 21, wherein the thin-film resistors comprise meandered metal traces.

23. The wireless power transmitting device of claim 18, wherein the temperature sensor components comprise thermistors.

* * * * *